United States Patent [19]

Pierson et al.

[11] Patent Number: 5,095,453

[45] Date of Patent: Mar. 10, 1992

[54] SENSOR MONITORING ARRANGEMENT WITH ERROR CORRECTION

[75] Inventors: John C. Pierson, Glendale; Dan J. Spacek, Cudahy; August A. Divjak, Waukesha, all of Wis.

[73] Assignee: Johnson Service Company, Milwaukee, Wis.

[21] Appl. No.: 612,396

[22] Filed: Nov. 13, 1990

[51] Int. Cl.$^5$ ............................................. G06F 15/20
[52] U.S. Cl. .................... 364/571.01; 364/571.03; 364/571.05; 364/557
[58] Field of Search .................. 364/571.01, 571.02, 364/571.03, 571.04, 571.05, 551.01, 557, 550, 481, 483, 571.06, 571.07, 571.08; 340/501; 73/1 R; 324/601

[56] References Cited

U.S. PATENT DOCUMENTS

| | | | |
|---|---|---|---|
| 4,473,797 | 9/1984 | Shiota | 364/571.04 |
| 4,532,601 | 7/1985 | Lenderking et al. | 364/571.03 |
| 4,575,806 | 3/1986 | Aldrich et al. | 340/501 |
| 4,642,636 | 2/1987 | Smith et al. | 364/571.01 |
| 4,873,655 | 10/1989 | Kondraske | 364/571.02 |
| 4,956,795 | 9/1990 | Yamaguchi | 364/571.03 |

Primary Examiner—Parshotam S. Lall
Assistant Examiner—Michael Zanelli
Attorney, Agent, or Firm—Foley & Lardner

[57] ABSTRACT

An arrangement monitors the values at sensors such as temperature sensors which each generate a voltage value related to the particular sensor temperature. The arrangement produces a digital value representative of the temperature at each sensor, wherein errors caused by fluctuations in the temperature of the arrangement circuitry and aging are reduced toward zero. The arrangement corrects for errors for a wide range of combinations of sensor temperatures and temperature fluctuation in the circuitry of the arrangement. The arrangement includes separate channel circuitry associated with each sensor and temperature independent references associated with each sensor type. Generally, to provide error correction, the arrangement uses stored comparison values to correct for channel-to-channel circuitry differences and stored values associated with the independent references to correct for temperature fluctuation and aging of the arrangement.

36 Claims, 7 Drawing Sheets

SENSOR MONITORING ARRANGEMENT WITH ERROR CORRECTION

TECHNICAL FIELD

This invention generally relates to a system for determining the value of a time-dependent variable at each of a plurality of sensors, and more particularly, to a system including an arrangement for compensating for errors caused by: temperature changes of the system circuitry; differences in the particular circuitry associated with each sensor; and aging of the system circuitry.

BACKGROUND OF THE INVENTION

Figure 1:
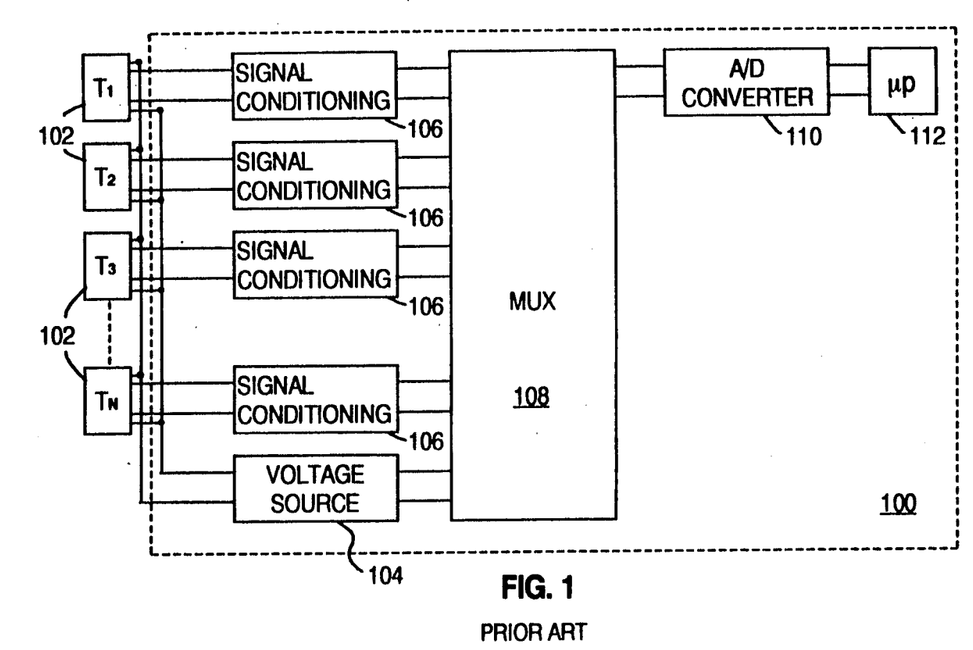
FIG. 1 is a block diagram which schematically represents a known arrangement for monitoring a plurality of temperature sensors.

FIG. 1 is a block diagram which schematically illustrates a known arrangement for monitoring the temperature at a plurality of temperature sensors T1-TN. Typically, this type of arrangement is incorporated within a control system for controlling the heating, air conditioning and ventilating of a building, wherein the temperature values obtained from temperature sensors T1-TN are used as feedback for the control system. In the case of many control systems, the circuitry of the control system, including the arrangement for monitoring, is subjected to severe temperature fluctuations which substantially alter the performance of the circuitry. For example, the circuitry of a control system may be located within a machinery room located upon the roof of a building wherein the temperature may fluctuate from below 0° F. to above 130° F.

The arrangement of FIG. 1 includes a circuit board 100, a plurality of resistive thermal devices 102 for sensing various ambient temperatures, a source 104 for providing current to devices 102, a signal conditioning circuit 106 associated with each of devices 102, a multiplexor 108, an analog-to-digital converter 110 and a microprocessor 112. Devices 102 are illustrated as being external to board 100 to represent a typical application wherein devices 102 may be tens or hundreds of feet from board 100.

In operation, microprocessor 112 is programmed to periodically sample the voltage at device 102 and voltage source 104 by variously selecting the appropriate channels of multiplexor 108. Various conditioning functions, such as filtering, are performed on the signals from device 102 and voltage source 104, and the signals are converted from an analog to a digital signal by convertor 110. Under ideal conditions—such as constant and optimum circuit board temperature, identical circuit characteristics from channel to channel, and circuitry which does not have changes is characteristics which vary with time—microprocessor 112 will sample the same digital signal from devices 102 when all of devices 102 are at the same temperature. Additionally, under ideal conditions, microprocessor 112 will sample the same digital signal from a given device 102, for a given temperature, regardless of the age and/or temperature of board 100.

Unfortunately, ideal conditions are not typically available, and the provision of ideal conditions is so costly that it is not practical or economically feasible to provide these conditions. Accordingly, various schemes have been developed to deal with the problems caused by variations in circuit characteristics due to fluctuations in circuit temperatures and differences in circuit characteristics from channel to channel.

In one scheme, the voltage at source 104 is monitored to compensate for changes in the temperature of board 100 since the voltage at source 104 is dependent upon the temperature of board 100. Based upon the voltage at source 104 of the board 100, microprocessor 112 is programmed to add or subtract an offset value from each of the digital signals representative of the temperatures sensed at one of devices 102. One problem with this scheme is that the digital value representative of the voltage at source 104 sampled by microprocessor 112 will also vary depending upon the age and/or temperature of circuit board 100. Accordingly, using such an arrangement does not provide an accurate reference for the purpose of correcting errors introduced in the digital signals representative of the temperatures sensed at one of devices 102, wherein the errors are caused by changes in circuit characteristics caused be aging and/or temperature fluctuations. In addition, the circuitry utilized in an arrangement such as that illustrated in FIG. 1, is not linear and the mere provision of offset values will not typically provide adequate error compensation. More specifically, the error introduced in the digital signals representative of the temperatures sensed at one of devices 102 is not only a function of changes in the temperature of the circuitry on board 100, but also a function of the temperature sensed at one of devices 102. Thus, merely compensating for changes in the voltage at source 104 does not take into account the non-linearity of the circuitry of board 100.

In a second scheme, directed to compensating for the differences in circuit characteristics from channel to channel, microprocessor 112 is programmed to add or subtract a particular offset value from each of the digital signals representative of the temperatures sensed at devices 102 depending upon which device 102 (T1-TN) is being sampled. The offset values are normally determined by a technician during the process of calibrating the circuitry. More specifically, a reference temperature is applied to each device 102 while board 100 is at ambient temperature from which the technician determines an offset value to be associated with each channel. These offset values serve to adjust the digital values representative of the temperature provided each channel. Subsequently, the offset values are programmed into the microprocessor software such that for a given reference temperature, the microprocessor 112 will produce similar temperature values regardless of the channel.

As with the first scheme discussed above, certain problems are inherent in the second scheme due to the non-linear characteristics of board 100 circuitry. More specifically, the channel-to-channel discrepancies are dependant upon both the particular temperature sensed by device 102 associated with the channel and the temperature of board 100 circuitry. In addition, the offset values are only determined for a single reference temperature and a single board 100 temperature. Accordingly, the set of offset values determined by the technician will only provide accurate discrepancy correction when one of devices 102 is sensing the reference temperature and board 100 is at the same temperature that it was at during calibration. Moreover, an accurate discrepancy correction for this single combination of reference and board temperature requires that the technician accurately determined the offset values.

Consequently, there remains the need for a system including an arrangement for compensating for errors introduced by the circuitry used for determining values representative of time-dependent variables such as temperature. These errors are of the type which can be attributed to the effects of the temperature changes in system circuitry, the differences in the particular circuitry associated with each of a plurality of variables, and the aging of system circuitry.

SUMMARY OF THE INVENTION

The invention provides a circuit arrangement for determining the value of a time-dependent variable and providing error correction. The arrangement includes first means for generating a first signal representative of a calibration parameter at a calibration element, second means for generating a second signal representative of the calibration parameter at a first time and for generating a sensor signal representative of the value at a sensor exposed to a time-dependent variable at a second time, a reference component which generates a third signal which is substantially independent of the temperature of the circuit arrangement, and means for applying a preselected offset value to the first, second, third and sensor signals and amplifying the first and second signals by a preselected factor to generate respective fourth, fifth, sixth and seventh signals. The arrangement further includes means for sampling the fourth, fifth, sixth and seventh signals to generate respective first, second and third calibration values, and a sensor value; means for storing the first, second and third calibration values; means for comparing the first and second calibration values to calculate a correction value; means for storing the correction value associated with the sensor; means for reading the third calibration value and the correction value; and means for calculating the value of the time-dependent variable based upon the third calibration value, the correction value and the sensor value.

The invention further provides a circuit arrangement for determining the value of a time-dependent variable and providing error correction. The arrangement includes a reference component which generates a first signal which is substantially independent of the temperature of the circuit arrangement, means for monitoring the first signal generated by the reference component and generating a calibration value at a first time and a reference value at a second time, means for storing the calibration value, means for producing a second signal representative of a time-dependent variable, means for sampling the second signal to generate a sample value representative of the variable at the second time, means for comparing the calibration value with the reference value, and means for calculating the value of the time-dependent variable as a function of the comparison and the sample value.

The invention further provides a circuit arrangement for determining the value of a time-dependent variable and providing error correction. The arrangement includes first means for generating a first signal representative of a calibration parameter at a calibration element, second means for generating a second signal representative of the calibration parameter and for generating a sensor signal representative of the value at a sensor exposed to a time-dependent variable, means for applying a preselected offset value to the first, second and sensor signals and amplifying the first and second signals by a preselected factor to generate respective third and fourth and fifth signals, and means for sampling the third, fourth and fifth signals to generate respective first and second calibration values, and a sensor value. The arrangement further includes means for comparing the first and second calibration values to calculate a correction value, means for storing the correction value in reference to the second means for generating, means for reading the correction value, and means for calculating the value of the time-dependent variable based upon the correction value and the sensor value.

The invention also provides a method for determining the value of a time-dependent variable. The method includes the steps of monitoring a substantially temperature independent reference component with a circuit to generate a calibration value, storing the calibration value, exposing a sensor to the variable, monitoring the sensor with the circuit to generate a first signal dependent upon the status of the sensor and the temperature of the circuit, monitoring the reference component with the circuit to generate a reference value, comparing the calibration value with the reference value, and calculating the value of the time-dependent variable based upon the comparison and the value of the first signal.

The invention further provides a method for determining the value of at least one time-dependent variable. The method includes the steps of exposing a first circuit to a calibration condition, sampling a first signal generated by a first circuit, wherein the first signal is representative of the calibration condition, and storing the value of the first signal. The method further includes the steps of exposing a second circuit to the calibration condition, sampling a reference signal generated by the second circuit, wherein the reference signal is representative of the calibration condition, and comparing the value of the reference signal with the value of the first signal to calculate a correction value. The method still further includes the steps of storing the correction value associated with the second sensor, coupling a sensor to the second circuit, exposing the sensor to the time-dependent variable, monitoring the sensor with the circuit to generate a second signal dependent upon the status of the sensor, reading the correction value, and calculating the value of the time-dependent variable based upon the correction value and the value of the second signal.

The invention further provides a method for determining the value of a time-dependent variable. The method includes the steps of exposing a first circuit to a calibration condition, sampling a first signal generated by a first circuit, wherein the first signal is representative of the calibration condition, and storing the value of the first signal. The method further includes the steps of monitoring a substantially temperature independent reference component with the circuit to generate a calibration value, storing the calibration value, exposing a second circuit to the calibration condition, sampling reference signal generated by the second circuit, wherein the reference signal is representative of the calibration condition, and comparing the value of the reference signal with the value of the first signal to calculate a correction value. The method still further includes storing the correction value associated with each sensor, coupling a sensor to the second circuit, exposing the sensor to the time-dependent variable, monitoring the sensor with second circuit to generate a second signal dependent upon the status of the sensor, reading the calibration and correction values, and calculating the value of the time-dependent variable based upon the calibration value, the correction value and the value of the second signal.

BRIEF DESCRIPTION OF THE DRAWINGS

The preferred exemplary embodiment of the present invention will hereinafter be described in conjunction with the appended drawings, wherein like designations denote like elements, and.

DETAILED DESCRIPTION OF THE PREFERRED EXEMPLARY EMBODIMENT

Figure 2:
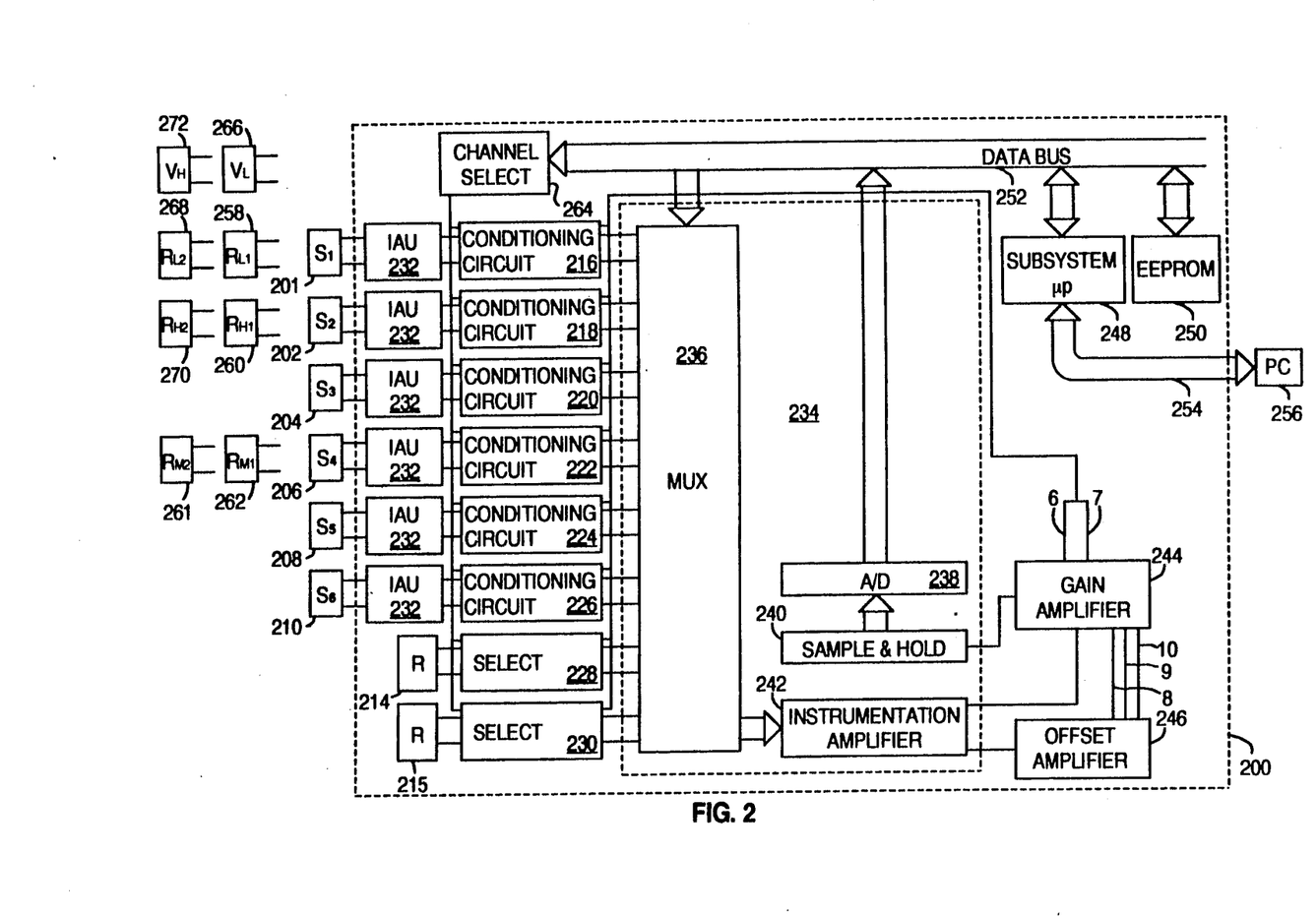
FIG. 2 is a block diagram which schematically represents the preferred exemplary embodiment of the arrangement for monitoring sensors.

Referring to FIG. 2, there is schematically illustrated an arrangement for monitoring the temperatures at a plurality of temperature sensors 201-210 according to the preferred exemplary embodiment of the invention. The circuitry for this arrangement is fabricated on a circuit board 200, preferably using surface mount components and techniques.

Each sensor 201-210 provides a variable resistance which is dependent upon the temperature to which it is exposed. By way of example only, each of sensors 201-210 may be a thermal resistive device (RTD) arranged to provide ranges of resistance such as from 600 to 1,600 ohms or from 80 to 150 ohms. Additionally, one or more of sensors 201-210 may be replaced with a voltage device which produces a voltage representative of a condition such as pressure Each sensor 201-210 is coupled to an interface circuit 232. Interface circuits 232 insure that the signals from each of sensors 201-210 are routed to the appropriate conditioning circuit 216-230. Further details of the circuits 232 can be found in U.S. Pat. Application Ser. No. 07/387,019 filed on July 28, 1989, the details of which are incorporated into this patent application by reference.

Conditioning circuits 216-226 supply a current to an associated temperature sensor 201-210 such that a particular resistance of a sensor 201-210, caused by a particular temperature at the sensor, results in a voltage at the sensor unique to the particular temperature. Conditioning circuits 216-226 also monitor the voltages at sensors 201-210, provide over-voltage protection and provide filtering for the voltages.

Ideally, circuits 216-226 would all have identical characteristics, but in practice the individual circuit characteristics deviate from each other. This deviation is the result of the circuits 216-226 being assembled from a number of components each having an associated tolerance. Because the tolerance of each component is within a range of component values, the cumulative component tolerances result in circuits 216-226 having the same general characteristics but which deviate at least slightly from each other. Compensations for circuit 216-226 characteristic deviations will be discussed in more detail below.

Figure 3:
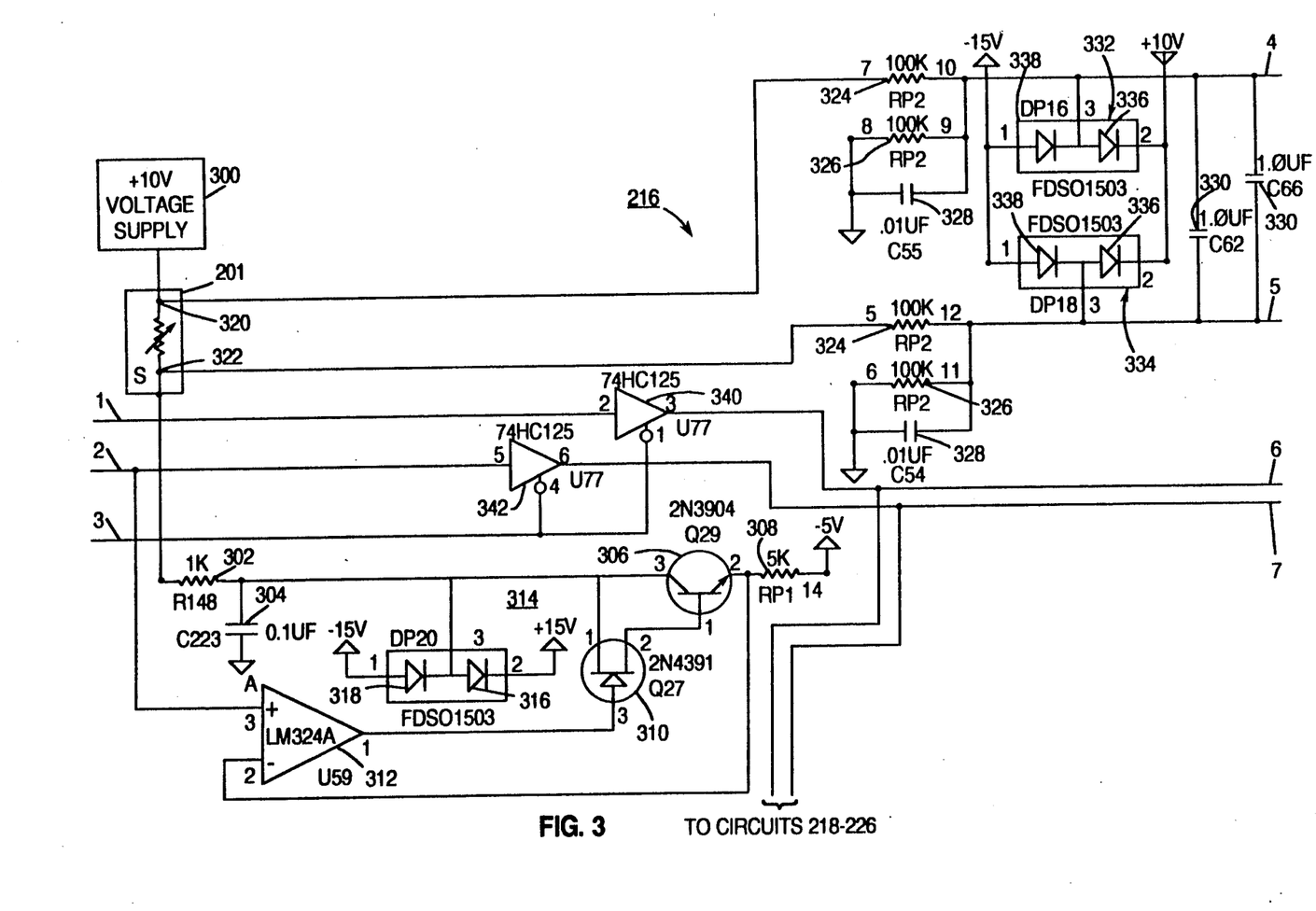
FIG. 3 is a circuit diagram for a conditioning circuit which may be utilized in practicing the present invention in accordance with the preferred embodiment.

Referring to FIG. 3, it illustrates, in circuit diagram form, a conditioning circuit which may be utilized for the conditioning circuits 216-226 in accordance with their preferred embodiment. For purposes of being clear and concise, only the details of one conditioning circuit 216 will be discussed in conjunction with one sensor 201.

The first side of sensor 201 is coupled to a 10 volt voltage supply 300 which has the ability to supply approximately 30 milliamps of current. The second side of sensor 201 is coupled to a 1000 ohm resistor 302 which is also coupled to a negative five volt reference through a transistor 306 and a 5,000 ohm resistor 308 arranged in series. The purpose of this arrangement is to create a constant current through sensor 201 to be selected at either 1 milliamp or 2 milliamps. More specifically, transistor 306 is driven with the arrangement of FET 310 and operational amplifier 312. When the non-inverting input to amplifier 312 is driven to 5 volts, transistor 306 conducts approximately 2 milliamps of current and when the non-inventing input is 0 volts, transistor 306 conducts approximately 1 milliamp of current. When the non-inverting input of operational amplifier 312 is driven to zero (0) volts, the current flow through transistor 306 is approximately 1 milliamp and the voltage difference across sensor 201 and resistor 302 is approximately 10 volts. Microprocessor 248 drives the non-inverting input of amplifier 312 over input line 2.

Resistor 302 is also coupled to an overvoltage protection arrangement 314. Arrangement 314 includes a first diode 316 coupled to a positive 15 volt reference and a diode 318 coupled to a negative voltage reference. Accordingly, arrangement 314 prevents the voltage across capacitor 304 from going below negative 15 volts or above positive 15 volts.

Sensor 201 is also coupled to a portion of conditioning circuit 216 which provides filtering for the voltage at sensor 201 and over voltage protection. In particular, each terminal 320, 322 is coupled to ground by a 100K ohm resistor 324 which is arranged in series with a 100K ohm resistor 326 and capacitor 328. Resistor 326 and capacitor 328 are arranged in parallel. To provide further filtering between multiplexor input lines 4 and 5, a pair of capacitors 330 are coupled between these inputs Overvoltage protection at inputs 4 and 5 is provided by voltage overprotection circuits 332 and 334. Circuit 332 is coupled to input 4 and circuit 334 is coupled to input 5. Circuits 332 and 334 have the same configurations, and each circuit 332 and 334 includes a first diode 336 coupled to a 10 volt reference and a second diode 338 coupled to a 15 volt reference. Accordingly, this overvoltage protection scheme prevents the voltages at inputs 4 and 5 from going above positive 10 volts or below negative 15 volts.

Input lines 4 and 5 of each circuit 216-230 are coupled to multiplexor 236. Multiplexor 236 selectively couples circuits 216-230 to instrumentation amplifier 242. The control of this selective coupling is provided by subsystem microprocessor 248 from which addressing data is transferred via databus 252 to multiplexor 236. Instrumentation amplifier 242 accepts the differential signals provided by the selected circuit 216-230 and provides an output signal which is referenced to ground. Instrumentation amplifier 242 is a unity gain amplifier and provides referencing to ground based upon its input from offset amplifier 246 as discussed below.

Figure 4:
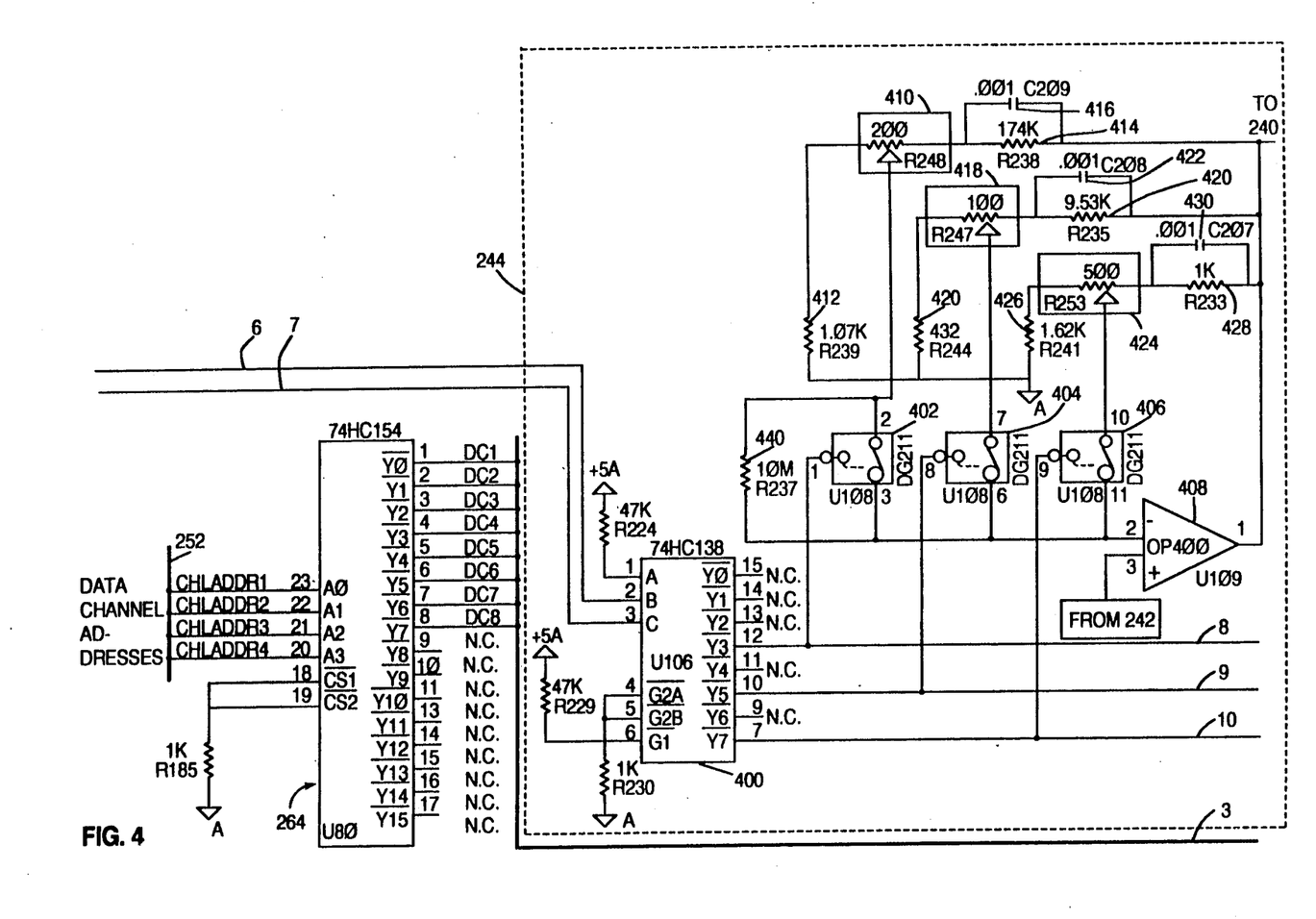
FIG. 4 is a circuit diagram for a channel select circuit and a gain amplifier which may be utilized in practicing the present invention in accordance with the preferred embodiment.

Each conditioning circuit 216-226 and each select circuit 228 and 230 includes a pair of tri-state buffers 340 and 342. Input lines 1 and 2, coupled to buffers 340 and 342 respectively, are driven by microprocessor 248. Input 3 to buffers 340 and 342 is driven by one of the respective data lines DC1-DC6 of a channel select circuit 264 (FIG. 4). Buffers 340 and 342 have three states, high impedance, logic high, and logic low. When input 3 to buffers 340 and 342 is at logic high, buffers 340 and 342 have an high impedance, thereby substantially isolating output terminals 6 and 7 from inputs 1 and 2. When input 3 is at logic low, buffers 340 and 342 apply the logic level from inputs 1 and 2 to outputs 6 and 7 respectively.

Inputs 1 and 2 are provided with gain select signals from microprocessor 248 and these signals are simultaneously provided to all of conditioning circuits 216-226 and select circuits 228 and 230. Furthermore, the signals provided to input 2 by microprocessor 248 are also provided to operational amplifiers 312 of circuits 216-226 which control the voltage differential across sensors 201-210 and resistors 302 as discussed above. Accordingly, to obtain the appropriate gain select signals at outputs 6 and 7, for a particular sensor 201-210 and associated conditioning circuit 216-226 or a particular resistive network 214,215, circuit 264 is required to selectively drive input 3 of the appropriate conditioning circuit 216-226 or select circuit 228-230 low.

Referring now to FIG. 4, channel select circuit 264 includes four channel address lines 20-23 and sixteen output select lines Y0-Y15. Microprocessor 248 is coupled to lines 20-23 via databus 252. Input bus line 3 is a parallel bus including eight conductors wherein each of the eight conductors is connected to one pair of buffers 340 and 342 of circuits 216-226 and select circuits 228 and 230. Accordingly, microprocessor 248 supplies circuit 264 with a four bit signal appropriate to drive one of outputs DC1-DC8 low at any one given point in time to apply the logic level from inputs 1 and 2 of a particular circuit 226-230 to outputs 6 and 7 respectively.

Outputs 6 and 7 and the signals from instrumentation amplifier 242 are provided to gain amplifier 244 (FIG. 2). Gain amplifier 244 scales the signals from instrumentation amplifier 242 such that a full scale signal supplied from one of sensors 201-210 results in a full scale signal from analog-to-digital convertor 238. The signals from gain amplifier 244 are provided to sample and hold 240 which serves to buffer the signals from gain amplifier 244 during the time period required for analog-to-digital convertor 238 to convert the voltage to a digital signal. The signals from analog-to-digital convertor 238 are provided to databus 252, from which, these signals are read by the subsystem microprocessor 248. Amplifiers 246 and 244 are adjusted during calibration to provide adequate offset and gain. (The calibration process is discussed in detail below.)

The dashed line labelled 244 in FIG. 4 represents the boundary of the circuitry for gain amplifier 244. Gain amplifier 244 includes a gain select circuit 400 which is coupled to outputs 6 and 7. Circuit 400 has the ability to accept three inputs in such a way to drive one of eight outputs Y0-Y7 logic low. In the preferred embodiment, only two inputs are utilized since the present embodiment of the system only uses three different levels of gain and three different levels of offset. Depending upon the signals provided at outputs 6 and 7, either Y3 (output 8), Y5 (output 9), or Y7 (output 10) is driven to logic low. Accordingly, either of switches 402, 404 or 406 can be closed.

Gain amplifier 244 also includes an operational amplifier 408. The non-inverting input of operational amplifier 408 is coupled to instrumentation amplifier 242 and the inverting input of operational amplifier 408 can be coupled to one of three feedback circuit arrangements coupled to the output of amplifier 408 depending upon which of switches 402-406 is closed. Switch 402, when closed, couples the inverting input of operational amplifier 408 to a 200 ohm potentiometer 410 which is coupled to ground with a 1,070 ohm resistor 412 and coupled to the output of operational amplifier 408 with a 174K ohm resistor 414. Potentiometer 410 has a range of 0 to 220 ohms. A capacitor 416 is connected across resistor 414 to provide filtering. When switches 402, 404 and 406 are open, a 10 million ohm resistor 440 couples the inverting input of operational amplifier 408 to ground via potentiometer 410 and resistor 412 for purposes of maintaining stable operation.

Switch 404 connects the inverting input of operational amplifier 408 to a potentiometer 418 which is coupled to ground with a 432 ohm resistor 420. Potentiometer 418 is a 100 ohm potentiometer having a range of 0 to 110 ohms and is coupled to the output of operational amplifier 408 with a 9.53K ohm resistor 420. A capacitor 422 is coupled across resistor 420 to provide proper feedback characteristics Switch 406 couples the inverting input of operational amplifier 408 to a 500 ohm potentiometer 424 having a range of 0 to 550 ohms which is coupled to ground with a 1,620 ohm resistor 426. Potentiometer 424 is also coupled to the output of operational amplifier 408 with a 1,000 ohm resistor 428. A capacitor 430 is coupled across resistor 428 to provide filtering.

Switch 402 provides a feedback circuit for operational amplifier 408 which produces a high gain (about 144 v/v to 167 v/v) at its output. Switch 402 is closed when the particular sensor 201-210 being monitored is a 100 ohm RTD. Switch 404 is associated with a feedback circuit which provides operational amplifier 408 with a medium gain (about 21 v/v to 24 v/v) at its output. Switch 406 is closed when a low gain voltage source is used in place of one of sensors 201-210 and is being sampled. Switch 406 is associated with a feedback circuit which provides operational amplifier 408 with the lowest relative gain (about 1.47 v/v to 1.92 v/v) at its output.

The output of operational amplifier 408 is provided to sample and hold circuit 240 as illustrated in FIGURE 2.

Figure 5:
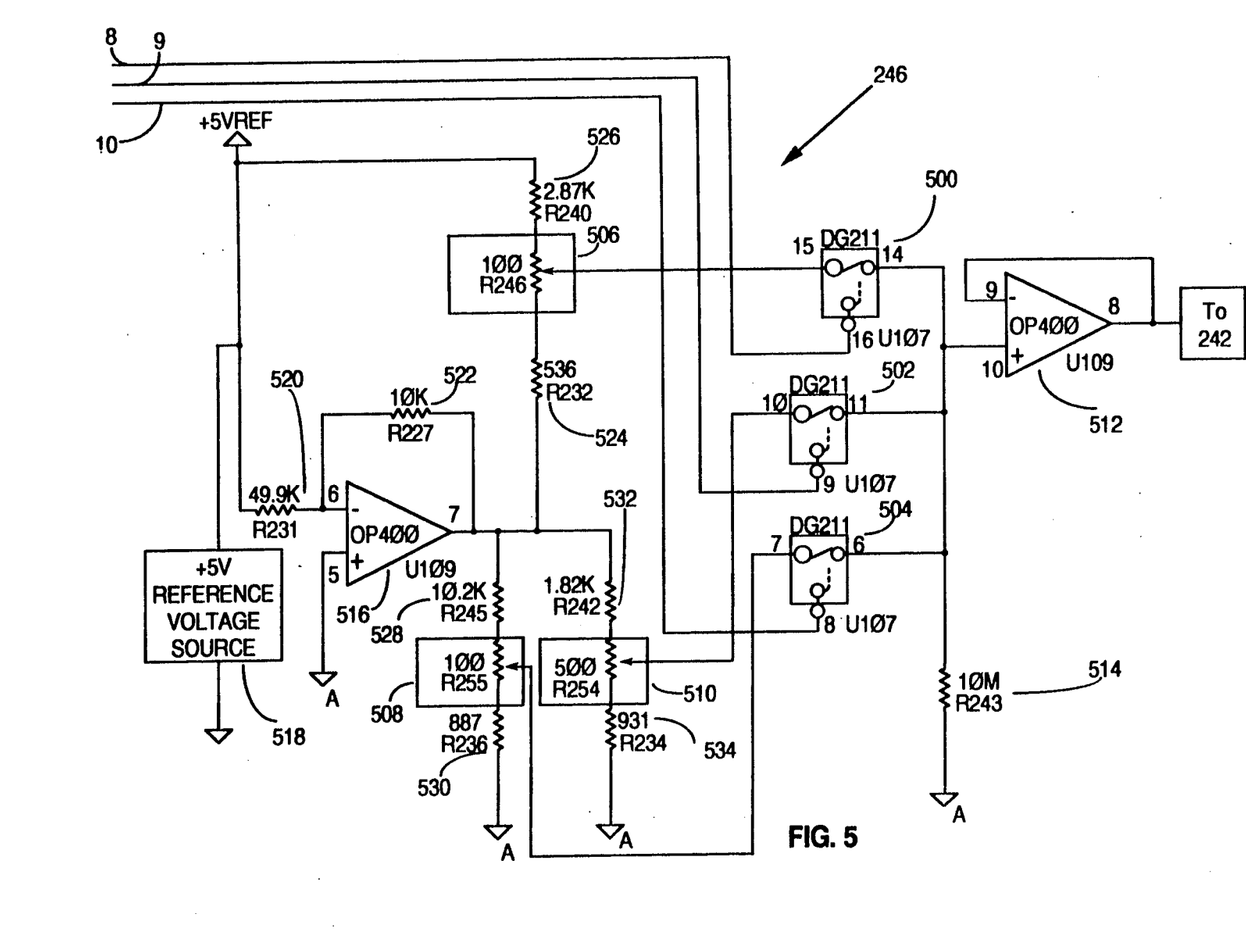
FIG. 5 is a circuit diagram for an offset circuit which may be utilized in practicing the present invention accordance with the preferred embodiment.

The outputs of circuit 400, in addition to being applied to switches 402, 404 and 406, are also applied to inputs 8, 9 and 10 of offset amplifier 246. Referring to FIG. 5, the circuit diagram for offset amplifier 246 is illustrated. As previously discussed, conditioning circuits 216-226 and select circuits 228 and 230 only provide a differential voltage to instrumentation amplifier 242 via multiplexor 236. Accordingly, instrumentation amplifier 242 requires a reference voltage for purposes of referencing the differential voltages. This reference is provided by offset amplifier 246.

Offset amplifier 246 includes three switches 500, 502 and 504 coupled to inputs 8, 9 and 10 respectively. Switches 500, 502 and 504 serve to selectively couple the tap of one of three potentiometers 506, 508 or 510 to a unity gain buffering operational amplifier 512 and ground via a 10 million ohm resistor 514. When switches 500, 502 and 504 are open, only resistor 514 couples the non-inverting input of operational amplifier 512 to ground for purposes of maintaining stable operation. Amplifier 246 also includes an operational amplifier 516 having its non-inverting input grounded and its inverting input coupled to a 5 volt reference voltage source 518 via a 49,900 ohm resistor 520. A 10,000 ohm feedback resistor 522 is coupled between the output and inverting input off operational amplifier 516. The output of operational amplifier 516 is also coupled to source 518 by 100 ohm potentiometer 506 coupled in series with a 536 ohm resistor 524 and a 2,870 ohm resistor 526. Additionally, the output of operational amplifier 516 is coupled to ground by the series connection of 100 ohm potentiometer 508, a 10,200 ohm resistor 528 and an 887 ohm resistor 530 arranged in parallel with the series connection of 500 ohm potentiometer 510, a 1820 ohm resistor 532 and a 931 ohm resistor 534.

Switch 504, when closed, provides an offset voltage between −0.0781 and −0.0903 volts to amplifier 512. Switch 504 is closed when the particular sensor 201–210 being sampled is a 100 ohm RTD. Switch 502, when closed, provides an offset voltage between −0.330 and −0.375 volts to amplifier. Switch 500 is closed when the particular sensor 201–210 being sampled is a 1,000 ohm RTD. Switch 504, when closed, provides an offset voltage between −0.0145 and +0.213 volts. Switch 500 is closed when a voltage source is being sampled instead of one of sensors 201–210.

By way of example only, multiplexor 236, instrumentation amplifier 242, sample and hold 240, and analog-to-digital convertor 238 are all included in a single package 234. This package can take the form of a Burr-Brown SDM 863JH combined circuit. Multiplexor 236 is an eight channel multiplexor, and analog-to-digital convertor 238 provides twelve bit resolution.

Figure 6:
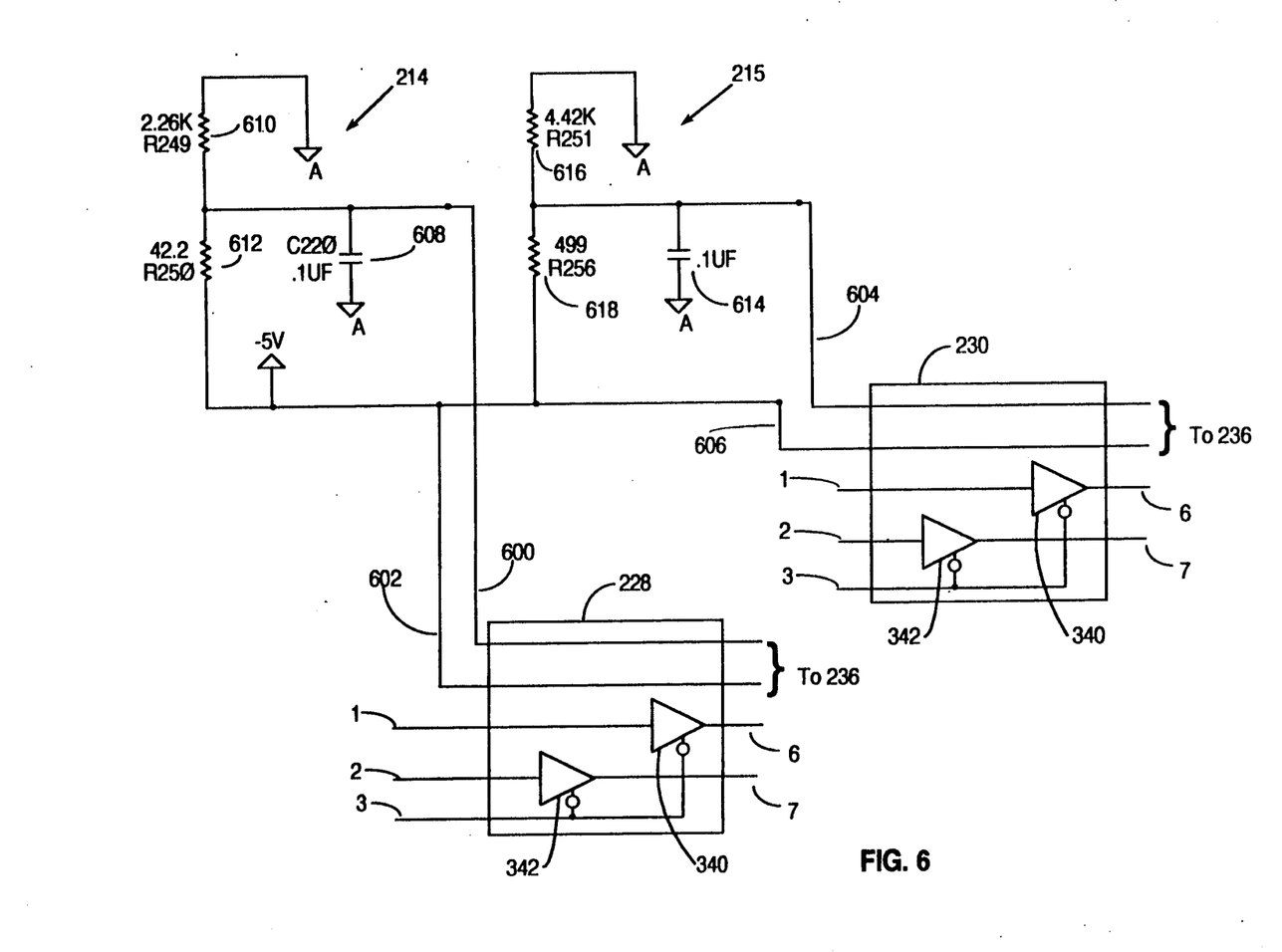
FIG. 6 is a circuit diagram for a pair of reference resistor networks and associated select circuits which may be utilized in practicing the present invention in accordance with the preferred embodiment.

Referring to FIG. 6, there are illustrated a pair of reference resistor networks 214 and 215. A pair of output lines 600,602 and 604,606 form each resistive network 214–215 pass through their respective select circuits 228 and 230 to multiplexor 236. Lines 602 and 606 are also connected to a −5 volt source.

Line 600 of network 214 is coupled to ground with a capacitor 608 in parallel with a very high quality temperature stable 2,260 ohm resistor 610, and to the −5 volt source with a very high quality temperature stable 42.2 ohm resistor 612. Line 604 of network 215 is also coupled to ground with a capacitor 614 in parallel with a very high quality temperature stable 4,420 ohm resistor 616, and to the −5 volt source with a very high quality temperature stable 499 ohm resistor 618.

These networks provide reference voltages (resistance) which are substantially independent of circuit board 200 temperature and the voltages sampled at terminals 320 and 322 of sensors 201–210. The networks 214 and 215 are chosen to represent a selected sensor type and associated temperature range. For example, for either 100 ohm or 1,000 ohm RTD used to monitor a temperature range of −50° F. to +250° F. More importantly, as discussed above, the differential voltages from networks 214 and 215 are provided to amplifier 242 via multiplexor 236 and select circuits 228 and 230.

Subsystem microprocessor 248 is coupled to databus 252. In addition to controlling levels at input lines 1 and 2, microprocessor 248 selectively controls the channel selection of multiplexor 236 and reads the data from analog-to-digital convertor 238 ia databus 252. Microprocessor 248 also reads and writes gain and offset values to an EEPROM 250 via databus 252. (Discussed in further detail below.) Microprocessor 248 calculates and outputs temperature values representative of the temperature at each of temperature sensors 201–212 based upon channel selection, data from convertor 238, gain values, and offset values. These temperature values can then be output over databus 254 to a control computer for another system such as a heating and ventilating system or a personal computer 256.

By way of example only, microprocessor 248 may be an Intel 80C188 microprocessor, databus 252 may be a parallel databus, and EEPROM 250 may be an SEEQ 6264 EEPROM. To avoid the effects of spurious voltage surges at sensors 201–210 and other adverse conditions to which the circuitry of board 200 is subjected, microprocessor may be optically isolated from databus 252.

As discussed above, subsystem microprocessor 248 may be coupled to a PC 256. Microprocessor 248 is typically coupled to PC 256 during the calibration and configuration of board 200. During the calibration and configuration of board 200, the offset of offset amplifier 246 is adjusted, the gain of gain amplifier 244 is adjusted, the value from analog-to-digital convertor 238 representative of the voltage at high quality resistor networks 214 and 215 is stored in EEPROM 250, and each of the values from analog-to-digital convertor 238 representative of the voltages provided by conditioning circuits 218–228 are stored in EEPROM 250. The calibration and configuration process is a nine (9) step process which is carried out as follows.

The first step is to replace sensor 201 with a low voltage source 266. Voltage source 266 has a voltage substantially equal to the lowest voltage value which would normally be produces by a low gain voltage device (sensor 201) during operation. While source 266 is in place, the values from analog-to-digital convertor 238, representative of the voltage at source 266, are displayed upon the PC monitor. Based upon the data displayed on the screen, a technician would adjust potentiometer 506 of offset amplifier 246 such that the value displayed upon the PC monitor corresponds to the lowest digital value which analog-to-digital convertor 238 is capable of outputting.

The second step is to replace sensor 201 with a voltage source 272. Voltage source 272 has a voltage substantially equal to the highest voltage value which would normally be produced by a low gain voltage device (sensor 201) during operation. While source 272 is in place, the values from analog-to-digital convertor 238, representative of the voltage at source 272, are displayed upon the PC monitor. Based upon the data displayed on the screen, a technician would adjust potentiometer 424 of gain amplifier 244 such that the value displayed upon the PC monitor corresponds to the lowest digital value which analog-to-digital convertor 238 is capable of outputting.

The third step is to replace sensor 201 with a reference resistor 260. Reference resistor 260 has a resistance substantially equal to the lowest resistance value which would normally be provided by a 1000 ohm RTD (sensor 201) during operation. While resistor 260 is in place, the values from analog-to-digital convertor 238, representative of the voltage at resistor 260, are displayed upon the PC monitor. Based upon the data displayed on the screen, a technician would adjust potentiometer 510 of offset amplifier 246 such that the value displayed upon the PC monitor corresponds to the lowest digital value which analog-to-digital convertor 238 is capable of outputting.

The fourth step is to replace sensor 201 with a reference resistor 270. Reference resistor 270 has a resistance substantially equal to the highest resistance value which would normally be provided by a 1000 ohm RTD (sensor 201) during operation. While resistor 270 is in place, the values from analog-to-digital convertor 238, representative of the voltage at resistor 260, are displayed upon the PC monitor. Based upon the data displayed on the screen, a technician would adjust potentiometer 418 of gain amplifier 244 such that the value displayed upon the PC monitor corresponds to the lowest digital value which analog-to-digital convertor 238 is capable of outputting.

The fifth step is to reference all conditioning circuits 218-226 to conditioning circuit 216 for purposes of using 1000 ohm RTDs in conjunction with one of circuits 216-226. This is accomplished by replacing sensor 201 with a resistor 261 having a resistance substantially equal to the average resistance which would normally be provided by a 1000 ohm RTD (sensor 201) during operation. Next, the value from analog-to-digital convertor 238 representative of the voltage at resistor 261 is provided to PC 256 and stored in memory. Subsequently, resistor 261 is used to replace each of sensors 202-210. The values from analog-to-digital convertor 238 associated with each voltage at resistor 261, when applied in place of each of sensors 202-210, are stored by PC 256. PC 256 then calculates the differences between the voltage value obtained from resistor 261 in place of sensor 201 and the values stored when resistor 261 was used to replace each of sensors 202-210. These difference values are then transmitted over databus 254 to microprocessor 248 which in turn stores these values in EEPROM 250.

The sixth step is to replace sensor 201 with a reference resistor 258. Reference resistor 258 is used to replace sensor 201. Resistor 258 has a resistance substantially equal to the lowest resistance value which would normally be provided by a 100 ohm RTD (sensor 201) during operation. Subsequently, the output values from analog-to-digital convertor 238 would be provided by microprocessor 248 to PC 256 via databus 254, such that these values would be displayed upon the PC monitor via databus 252, microcomputer 248, databus 254, and PC 256 (not shown). At this point, a technician would adjust potentiometer 508 of offset amplifier 246 so that the value displayed upon the PC monitor corresponds to the lowest value which analog-to-digital convertor 238 is capable of outputting.

The seventh step of the calibration process is to replace sensor 201 with a reference resistor 268. Reference resistor 268 is first used to replace sensor 201. Resistor 268 has a resistance substantially equal to the highest resistance value which would normally be provided by a 100 ohm RTD (sensor 201) during operation. Subsequently, the output values from analog-to-digital convertor 238 would be provided by microprocessor 248 to PC 256 via databus 254, such that these values would be displayed upon the PC monitor via databus 252, microcomputer 248, databus 254, and PC 256 (not shown). At this point, a technician would adjust potentiometer 410 of gain amplifier 244 so that the value displayed upon the PC monitor corresponds to the highest value which analog-to-digital convertor 238 is capable of outputting.

The eighth step is to reference all conditioning circuits 218-226 to conditioning circuit 216 for the purpose of using 100 ohm RTDs in conjunction with one of circuits 216-226. This is accomplished by replacing sensor 201 with a resistor 262 having a resistance substantially equal to the average resistance which would normally be provided by a 100 ohm RTD (sensor 201) during operation. Next, the value from analog-to-digital convertor 238 representative of the voltage at resistor 262 is provided to PC 256 and stored in memory. Subsequently, resistor 262 is used to replace each of sensors 202-210. The values from analog-to-digital convertor 238 associated with each voltage at resistor 262, when applied in place of each of sensors 202-210, are stored by PC 256. PC 256 then calculates the differences between the voltage value obtained from resistor 262 in place of sensor 201 and the values stored when resistor 262 was used to replace each of sensors 202-210. These difference values are then transmitted over databus 254 to microprocessor 248 which in turn stores these values in EEPROM 250.

To calibrate the arrangement to work with RTDs having resistance ranges of 80 to 160 ohms and 600 to 1,600 ohms, resistance 258 would be set to 80 ohms, resistance 260 would be set to 600 ohms, resistance 268 would be set to 160 ohms, resistance 270 would be set to 1600 ohms, the resistance 262 would be set to 1,000 ohms, and resistance 261 would be set to 100 ohms.

The ninth step requires the storage of the values from analog-to-digital convertor 238 representative of the voltages at resistor networks 214 and 215. This step is accomplished by selecting the respective channels of multiplexor 236 associated with networks 214 and 215 and providing the values from analog-to-digital convertor 238 to PC 256 via databus 252, microprocessor 248, and databus 254, wherein PC 256 instructs microprocessor 248 to store these reference values in EEPROM 250. After the completion of this third step, the calibration of the circuit on board 200 is complete, and the arrangement is in condition to be coupled to sensors 201-210.

The overall operation of the arrangement for 7 monitoring temperatures at sensors 201-210 will now be discussed in detail. Microprocessor 248 selectively controls multiplexor 236 such that conditioning circuits 216-226 and select circuits 228 and 230 are coupled to instrumentation amplifier 242 either selectively, or sequentially one after the other. Microprocessor 248 also provides line 3 of circuits 216-230 with the appropriate circuit select signal, and gain/offset select signal via channel select 264. For purposes of clarity, the monitoring process of temperature at only one sensor 202 will be described. Additionally, it will be assumed that sensor 202 is a 100 ohm RTD.

To sample the voltage at sensor 202, microprocessor 248 controls multiplexor 236 such that select circuit 228 is first coupled to instrumentation amplifier 242, and lines 1-3 of circuit 228 are provided with signals from microprocessor 248 appropriate to provide the offset and gain values associated with potentiometers 508 and 410 respectively. At this time, the signal from analog-to-digital converter 238 is read by microprocessor 248 and the value of this signal is compared with the calibration value stored in EEPROM 250 associated with resistive network 214. Based upon this comparison, microprocessor 248 stores the difference between the value of the signal from analog-to-digital convertor 238 and the calibration value.

Circuit 228 is coupled to amplifier 242 since resistive network 214 is the independent reference voltage used with 100 ohm RTDs. If sensor 202 was a 1000 ohm RTD, circuit 230 would be coupled to amplifier 242, since resistive network 215 is the independent reference voltage used with 1000 ohm RTDs.

Subsequently, microprocessor 248 controls multiplexor 236 to couple conditioning circuit 218 to instrumentation amplifier 242. During this time, microprocessor 248 also controls lines 1-3 of circuit 218 to provide the offset and gain values associated with potentiometers 508 and 410 respectively. (If sensor 202 was a 1000 ohm RTD or a low gain voltage source, lines 1-3 would be controlled to provide the offset and gain values associated with potentiometers 510 and 402, and potentiometers 500 and 406 respectively.) Microprocessor 248 then compares the value of the signal produced by analog-to-digital convertor 238 to the difference value associated with conditioning circuit 218 stored in EEPROM 250. Based upon this comparison, the difference between the value and the difference value are stored by microprocessor 248. Using these differences, microprocessor 248 calculates the value of the temperature at sensor 202 based upon the following equation (1):

$$CNTS = (CNTSin + CHtoCH) - ((CNTSin + CHtoCH)*K_1 + K_2(CHread - CHstore).$$

CNTS is the digital value representative of the temperature at sensor 202 which includes compensation for characteristic changes in the circuitry of board 200 caused by fluctuations in temperature and aging of system components, and differences between the particular circuitry associated with sensors 202-210 and the circuitry associated with sensor 201. The term CNTSin+CHtoCH adjusts for differences in the circuitry associated with each particular sensor 201-210, and the term CHread-CHstore compensates for changes in circuitry characteristics due to temperature changes of board 200 and aging affects.

More specifically: CNTSin is the value of the signal produced by analog-to-digital convertor 238 associated with sensors 202; CHtoCH is the particular difference value stored during calibration and configuration for sensor 202 and associated conditioning circuit 218; CHread is the value of the signal produced by analog-to-digital convertor 238 associated with resistive network 214; and CHstore is the reference value stored during calibration and configuration for resistive network 238. The constants $K_1$ and $K_2$ in the equation depends upon the overall circuit arrangement and the type of resistive thermal device used with the arrangement.

The constants $K_1$ and $K_2$ can be calculated based upon the particular circuitry used on board 200 or determined empirically. By way of example only, suitable $K_1$ and $K_2$ values for the particular circuitry of the preferred embodiment when 100 Ohm RTDs are used for sensors 201-212 are 0.9 and 0.00015 respectively. When 1000 Ohm RTDs are used for sensors 201-212 suitable $K_1$ and $K_2$ values are 0.0003 and 0.83186 respectively.

Figure 7:
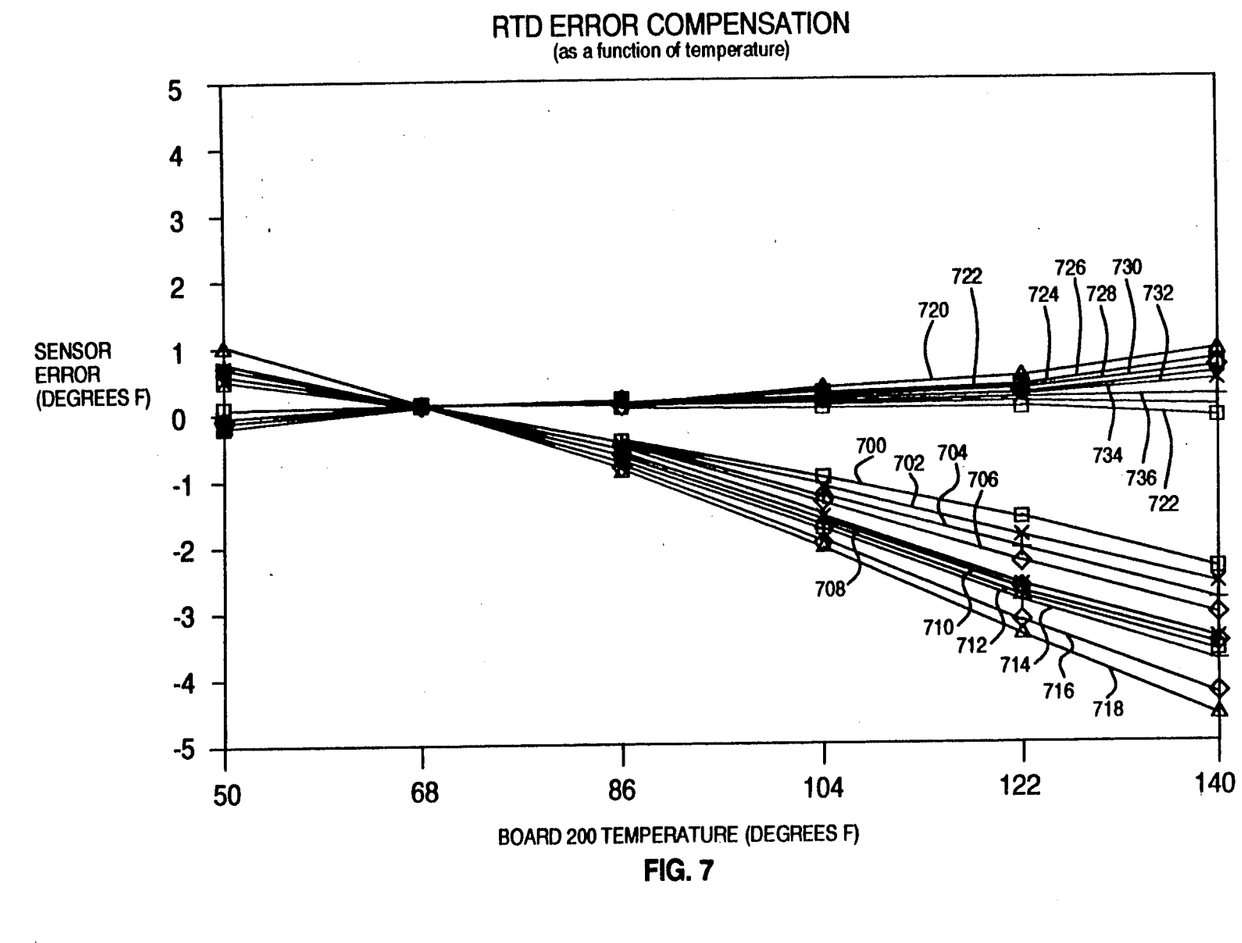
FIG. 7 is a graph illustrating an example of sensor errors as a function of circuitry temperature and sensed temperatures.

By way of example, referring to FIG. 7, there is illustrated a family of curves 700-718 representative of the temperature and aging (drift) errors caused by a given board 200 circuitry. The y depending upon board 200 circuitry temperature and the temperature sensed at a sensor 201-210. More specifically, curves 700-718 are associated with sensor temperatures as follows:

| Curve | Sensed Temperature |
|-------|--------------------|
| 700 | 0° F. |
| 702 | 50° F. |
| 704 | 75° F. |
| 706 | 100° F. |
| 708 | 125° F. |
| 710 | 150° F. |
| 712 | 175° F. |
| 714 | 200° F. |
| 716 | 225° F. |
| 718 | 250° F. |

By calculating the temperatures at sensors 201-210 using equation 1, these errors are substantially reduced. More specifically, the temperature errors before using equation 1 had a total error range of 5.5° F. full scale, whereas after using equation 1 the error range was reduced to 0.5° F. full scale. Referring to equation 1 specifically, constants $K_1$ and $K_2$ serve to reduce the error between sensor values i.e., converge curves 700-718, and the term ($CH_{read} - CH_{store}$) adjusts the slope of the converged curves to reduce the absolute error toward zero.

It will be understood that the foregoing description is of one preferred embodiment of the present invention, and is not limited to the specific forms shown. Modifications may be made in the design and arrangement of the elements within the scope of the present invention as expressed in the appended claims. For example, sensors 201-210 are not limited to temperature and pressure sensing devices, and may take the form of devices for sensing other time-dependent variables such as radiation, flow rate or noise levels.

What is claimed is:

1. A circuit arrangement for determining a value of a time-dependent variable, the arrangement having a temperature and providing error correction, the arrangement comprising:

first means for generating a first signal representative of a calibration parameter at a calibration element;

second means for generating a second signal representative of the calibration parameter at a first time and for generating a sensor signal representative of a signal produced by a sensor exposed to a time-dependent variable at a second time;

a reference component which generates a third signal which is substantially independent of the temperature of the circuit arrangement;

means for applying a preselected offset value tot he first, second, third and sensor signals and amplifying the first and second signals by a preselected factor to generate respective fourth, fifth, sixth and seventh signals;

means for sampling the fourth, fifth, sixth and seventh signals to generate respective first, second and third calibration values, and a sensor value;

means for comparing the first and second calibration values to calculate a correction value;

means for storing the correction value associated with said sensor, and the first, second and third calibration values;

means for reading the third calibration value and the correction value; and means for calculating the value of the time-dependent variable based upon said third calibration value, said correction value and said sensor value.

2. The arrangement of claim 1, wherein said time-dependent variable is temperature.

3. The arrangement of claim 1, wherein said calibration element is a resistor and said sensor is a resistive thermal device.

4. The arrangement of claim 1, wherein said first, second, third and sensor signals are time varying voltages.

5. The arrangement of claim 1, wherein said reference component comprises at least a resistor having a resistance value which is substantially independent of said resistor temperature.

6. The arrangement of claim 4, wherein said first means for generating comprises a first conditioning circuit coupled to said calibration element; and said second means for generating comprises a second conditioning circuit coupled to said sensor.

7. The arrangement of claim 6, wherein said means for sampling comprises:

an analog-to-digital converter; and means for coupling said conditioning circuits to the analog-to-digital converter such that said calibration values and sensor value are digital values output by said analog-to-digital converter.

8. The arrangement of claim 7, wherein said means for comparing, said means for reading and said means for calculating comprise a microprocessor.

9. The arrangement of claim 8, wherein said means for coupling comprises a multiplexor and an instrumentation amplifier.

10. The arrangement of claim 9, wherein said means for applying comprises:

an offset amplifier coupled to the instrumentation amplifier such that a selectable offset voltage is supplied to the instrumentation amplifier; and a gain amplifier coupled between the instrumentation amplifier and the analog-to-digital convertor such that the signals transmitted from the instrumentation amplifier to the analog-to-digital convertor are amplifier by a selectable gain.

11. The arrangement of claim 10, wherein said means for storing the first, second and third calibration values comprises:

a microprocessor coupled to the analog-to-digital converter; and an EEPROM coupled to the microprocessor.

12. A circuit arrangement for determining a value of a time-dependent variable, the circuit arrangement having a temperature and providing error correction, the arrangement comprising:

a reference component which generates a first signal which is substantially independent of the temperature of the circuit arrangement;

means for monitoring the first signal at a first time to generate a calibration value and at a second time to generate a reference value;

means for storing the calibration value;

means for producing a second signal representative of a time-dependent variable;

means for sampling the second signal to generate a sample value representative of the variable at the second time;

means for comparing the calibration value with the reference value; and means for calculating the value of the time-dependent variable as a function of the comparison and the sample value.

13. The arrangement of claim 12, wherein said reference component comprises at least one resistor having a resistance value which is substantially independent of the resistor temperature.

14. The arrangement of claim 12, wherein said time-dependent variable is temperature.

15. A circuit arrangement for determining a value of a time-dependent variable, the circuit arrangement having a temperature and providing error correction, the arrangement comprising:

a reference component which generates a time varying voltage which is substantially independent of the temperature of the circuit arrangement;

means for monitoring the time varying voltage generated by said reference component and generating a calibration value at a first time and a reference value at a second time;

means for storing the calibration value;

mean for producing a second signal representative of a time-dependent variable;

means for sampling the second signal to generate a sample value representative of the variable at the second time;

means for comparing the calibration value with the reference value; and means for calculating the value of the time-dependent variable as a function of the comparison and the sample value.

16. The arrangement of claim 15, wherein said means for monitoring comprises:

an analog-to-digital converter; and means for coupling the reference component to the analog-to-digital converter such that the calibration and reference values are digital values output by the analog-to-digital converter.

17. The arrangement of claim 15, wherein said means for sampling comprises:

an analog-to-digital converter; and means for coupling said reference component to said analog-to-digital converter such that said sample value is a digital value output by said analog-to-digital converter.

18. The arrangement of claim 16, wherein said means for storing comprises:

a microprocessor coupled to said analog-to-digital converter; and an EEPROM coupled to said microprocessor.

19. The arrangement of claim 16, wherein said means for producing a second signal comprises a resistive thermal device, and said second signal is a voltage.

20. The arrangement of claim 17, wherein said means for comparing comprises a microprocessor.

21. The arrangement of claim 17, wherein said means for calculating comprises a microprocessor.

22. The arrangement of claim 17, wherein said means for coupling comprises:

a conditioning circuit;

a multiplexor coupled to said conditioning circuit;

an instrumentation amplifier coupled to said multiplexor;

an offset amplifier coupled to said instrumentation amplifier; and a gain amplifier coupled between the instrumentation amplifier and the analog-to-digital converter.

23. A circuit arrangement for determining a value of a time-dependent variable, the circuit arrangement having a temperature and providing error correction, the arrangement comprising;

first means for generating a first signal representative of a calibration parameter at a calibration element;

second means for generating a second signal representative of said calibration parameter and for generating a sensor signal representative of the value at a sensor exposed to a time-dependent variable;

means for applying a preselected offset value to said first, second and sensor signals and amplifying said first and second signals by a preselected factor to generate respective third and fourth and fifth signals;

means for sampling said third, fourth and fifth signals to generate respective first and second calibration values, and a sensor value;

means for comparing said first and second calibration values to calculate a correction value;

means for storing said correction value in reference to said second means for generating;

means for reading said correction value; and means for calculating the value of the time-dependent variable based upon said correction value and said sensor value.

24. The arrangement of claim 23, wherein said time-dependent variable is temperature.

25. The arrangement of claim 23, wherein said calibration element is a resistor and said sensor is a resistive thermal device.

26. The arrangement of claim 23, wherein said first, second and sensor signals are time varying voltages.

27. The arrangement of claim 26, wherein the first means for generating comprises a first conditioning circuit coupled to said calibration element; and said second means for generating comprises a second conditioning circuit coupled to said sensor.

28. The arrangement of claim 27, wherein said means for sampling comprises:

an analog-to-digital converter; and means for coupling said conditioning circuits to said analog-to-digital converter such that said calibration values and sensor value are digital values output by said analog-to-digital converter.

29. The arrangement of claim 28, wherein said means for comparing, said means for reading and said means for calculating comprise a microprocessor.

30. The arrangement of claim 29, wherein said means for coupling comprises a multiplexor and an instrumentation amplifier.

31. The arrangement of claim 30, wherein said means for applying comprises:

an offset amplifier coupled to said instrumentation amplifier; and a gain amplifier coupled between said instrumentation amplifier and said analog-to-digital convertor.

32. The arrangement of claim 31, wherein the means for storing comprises:

a microprocessor coupled to said analog-to-digital converter; and an EEPROM coupled to said microprocessor.

33. A method for determining a value of a time-dependent variable comprising the steps of:

monitoring a substantially temperature independent reference component with a circuit to generate a calibration value at a first time;

storing the calibration value;

exposing a sensor to the time-dependent variable;

monitoring the sensor with said circuit to generate a first signal dependent upon the status of the sensor and the temperature of said circuit at a second time;

monitoring the reference component with said circuit to generate a reference value at the second time;

comparing the calibration value with the reference value; and calculating the value of the time-dependent variable based upon the comparison and the value of the first signal.

34. A method for determining a value of at least one time-dependent variable comprising the steps of:

exposing a first circuit to a calibration condition;

sampling a first signal generated by a first circuit, wherein the first signal is representative of the calibration condition;

storing the value of the first signal;

exposing a second circuit to the calibration condition;

sampling a reference signal generated by the second circuit, wherein the reference signal is representative of the calibration condition;

comparing the value of the reference signal with the value of the first signal to calculate a correction value;

storing the correction value;

coupling a sensor to the second circuit;

exposing the sensor to the time-dependent variable;

monitoring the sensor with the circuit to generate a second signal dependent upon the status of the sensor;

reading the correction value; and calculating the value of the time-dependent variable based upon the correction value and the value of the second signal.

35. A method for determining a value of a time-dependent variable comprising the steps of:

exposing a first circuit to a calibration condition;

sampling a first signal generated by the first circuit, wherein the first signal is representative of the calibration condition;

storing the value of the first signal;

monitoring a substantially temperature independent reference component with the first circuit to generate a calibration value;

storing the calibration value;

exposing a second circuit to the calibration condition;

sampling a reference signal generated by the second circuit, wherein the reference signal is representative of the calibration condition;

comparing the value of the reference signal with the value of the first signal to calculate a correction value;

storing the correction value associated with each sensor;

coupling a sensor to the second circuit;

exposing the sensor to the time-dependent variable;

monitoring the sensor with second circuit to generate a second signal dependent upon the status of the sensor;

storing the second signal;

reading the stored calibration value, correction value and the second signal; and calculating the value of the time-dependent variable based upon the calibration value, the correction value and the value of the second signal.

36. A circuit arrangement for determining a value of a time-dependent variable, the circuit arrangement having a temperature and providing error correction, the arrangement comprising:

at least one resistor having a resistance value substantially independent of the resistor temperature and which operates a first signal which is substantially independent of the temperature of the circuit arrangement;

means for monitoring the first signal generated by said reference component and generating a calibration value at a first time and a reference value at a second time;

means for storing the calibration value;

means for producing a second signal representative of a time-dependent variable;

means for sampling the second signal to generate a sample value representative of the variable at the second time; p1 means for comparing the calibration value with the reference value; and means for calculating the value of the time-dependent variable as a function of the comparison and the sample value.

* * * * *

UNITED STATES PATENT AND TRADEMARK OFFICE
CERTIFICATE OF CORRECTION

PATENT NO. : 5,095,453
DATED : March 10, 1992
INVENTOR(S) : John C. Pierson, Dan J. Spacek, and August A. Divjak It is certified that error appears in the above-identified patent and that said Letters Patent is hereby corrected as shown below:

Claim 1, line 59, "tot he" should read --to the--.
Claim 10, line 49, "amplifier" should read --amplified--.
Claim 36, Column 20, line 8, delete "pl".

Signed and Sealed this

Eighth Day of June, 1993

Attest:

MICHAEL K. KIRK

*Attesting Officer*  Acting Commissioner of Patents and Trademarks